(12) United States Patent
Westerberg et al.

(10) Patent No.: US 6,672,547 B1
(45) Date of Patent: Jan. 6, 2004

(54) HOLDER FOR ATTACHMENT OF OBJECTS

(75) Inventors: Peder Westerberg, Askim (SE); Mats Söderlund, Stenungsund (SE); Ulf Granäng, Kungälv (SE)

(73) Assignee: Volvo Lastvagnar AB (SE)

( * ) Notice: Subject to any disclaimer, the term of this patent is extended or adjusted under 35 U.S.C. 154(b) by 0 days.

(21) Appl. No.: 09/331,643

(22) PCT Filed: Dec. 30, 1997

(86) PCT No.: PCT/SE97/02215

§ 371 (c)(1),
(2), (4) Date: Oct. 25, 1999

(87) PCT Pub. No.: WO98/29677

PCT Pub. Date: Jul. 9, 1998

(30) Foreign Application Priority Data

Dec. 30, 1996 (SE) ............................................... 9604845

(51) Int. Cl.⁷ ............................... F16L 3/08; F16L 3/12
(52) U.S. Cl. .................. 248/74.1; 248/68.1; 248/316.1; 248/71; 411/431; 411/377; 411/197; 411/194
(58) Field of Search ........................ 248/69, 74.1, 74.3, 248/74.2, 68.1, 316.1, 71; 411/182, 324, 924.1, 431, 377, 193, 194; 174/72 A, 135

(56) References Cited

U.S. PATENT DOCUMENTS

| 3,471,109 A | * | 10/1969 | Meyer | 248/68 |
| 3,513,508 A | * | 5/1970 | Modeme | 248/74.1 |
| 3,545,708 A | | 12/1970 | Gross | |
| 3,856,244 A | * | 12/1974 | Menshen | 248/68 |
| 4,042,198 A | * | 8/1977 | Takeuchi | 248/62 |
| 4,214,723 A | * | 7/1980 | Voorhees, Jr. | 248/68 |
| 4,369,947 A | | 1/1983 | Kuwano | |
| 4,379,537 A | | 4/1983 | Perrault et al. | |
| 4,444,370 A | * | 4/1984 | Krueger | 248/74.1 |
| 4,541,602 A | * | 9/1985 | Potzas | 248/544 |
| 4,550,891 A | * | 11/1985 | Schaty | 248/68.1 |
| 4,770,582 A | * | 9/1988 | Junemann et al. | 411/182 |
| 4,899,964 A | * | 2/1990 | Sick | 248/68.1 |
| 5,154,376 A | | 10/1992 | Baum et al. | |
| 5,188,319 A | * | 2/1993 | Hawash et al. | 248/68.1 |
| 5,271,587 A | * | 12/1993 | Schaty et al. | 248/68.1 |
| 5,598,994 A | * | 2/1997 | Olewinski et al. | 248/73 |
| 5,760,338 A | * | 6/1998 | Suzuki | 174/72 |
| 5,941,483 A | * | 8/1999 | Baginski | 248/68.1 |

FOREIGN PATENT DOCUMENTS

| DE | 1 249 372 | 9/1967 |
| WO | 94/29625 | 12/1994 |

* cited by examiner

Primary Examiner—Kimberly Wood
(74) Attorney, Agent, or Firm—Lerner, David, Littenberg, Krumholz & Mentlik, LLP

(57) ABSTRACT

A holder is disclosed for mounting objects to a fastener. The holder includes a holding section for mounting object and an anchoring section for mounting the holder onto the fastener, the anchoring section including a cylindrical recessed portion having a circular opening, a bottom and a first inward circumferential surface adapted to engage an outward circumferential surface of the fastener, and an opening in the bottom surface comprising a second inward circumferential surface adapted to engage a second outward circumferential surface on the fastener.

3 Claims, 3 Drawing Sheets

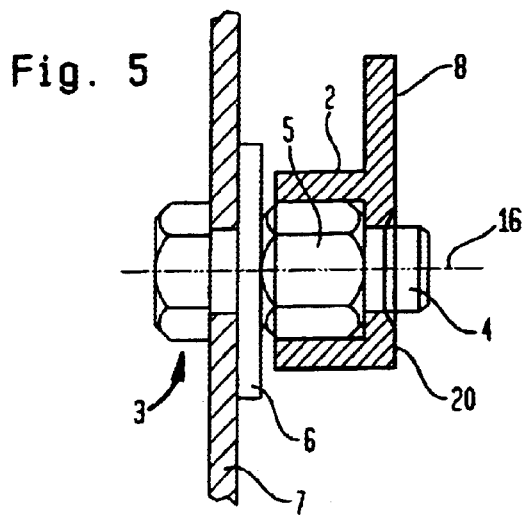
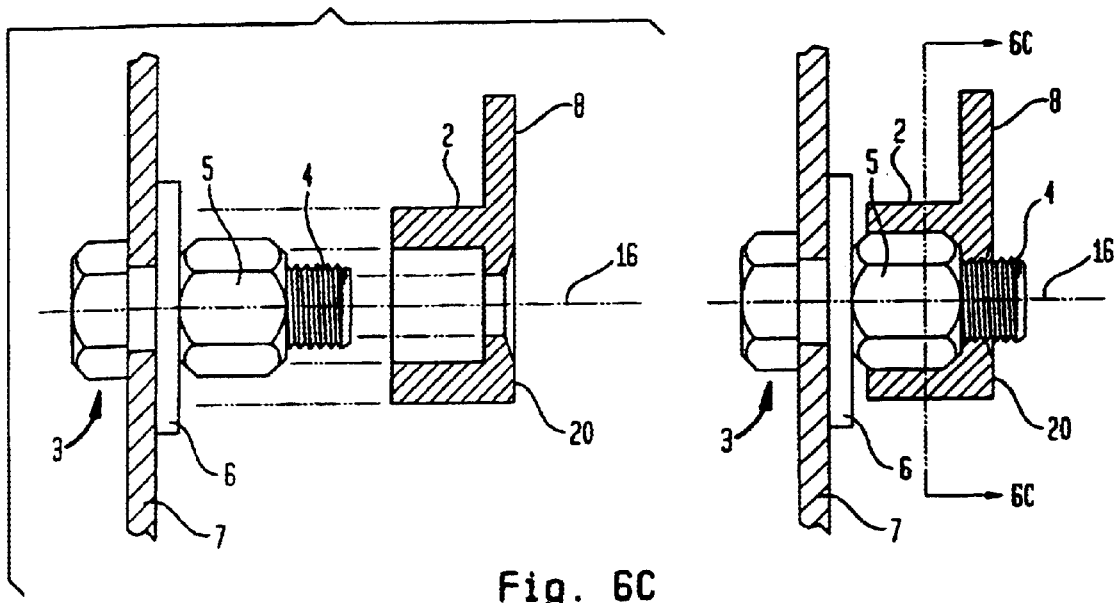
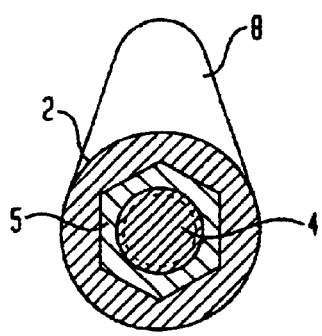

HOLDER FOR ATTACHMENT OF OBJECTS

FIELD OF THE INVENTION

The present invention relates to a holder for holding objects by means of fastening member, which holder has an anchoring section which is provided with at least one engagement surface in the shape of an inwardly facing circumferential surface which is arranged, when mounted, to be biased onto an outwardly facing circumferential surface of the fastening member and is formed by a female part in the shape of a recess, wherein the holder is provided with holding means for holding objects.

BACKGROUND OF THE INVENTION

The conventional technique for holding objects to an existing fastening member, such as a screw joint, is to clamp the holder between a screw head or, alternatively, between a nut and a fastening surface (see FIG. 1). This is utilized, for example, in the vehicle industry for holding cabling, wherein the holder is constructed as an angularly bent sheet-metal bracket which is provided with a hole, through which the screw extends. The screw member may, for example, form part of a vehicle beam construction for the purpose of keeping structural members together. In this regard, the holder must be mounted at the same time as the preparation of the screw joint, wherein there is a risk of the holder changing position to an incorrect position during tightening, due to the friction between the holder and parts in the screw joint. Furthermore, the holder is exposed to the same tightening forces as the screw joint itself, which demands a great deal of the physical properties of the holder material. Likewise, the screw joint must be unfastened when the holder is to be exchanged. Apart from good physical properties, which in practice means that the holder must be constructed of metal, it is required that the holder does not cause corrosion problems, which easily arise between surfaces lying close together.

The object of the present invention is to eliminate the above-mentioned problems and to provide a holder which is easy to mount and later exchange and which can be adjusted and kept in a fixed position.

SUMMARY OF THE INVENTION

In accordance with the present invention, these and other objects have now been realized by the invention of a holding device for mounting predetermined objects with respect to a fastening member including a first outward circumferential surface and a second outward circumferential surface, the holding device comprising a holding section for mounting the predetermined object, and an anchoring section for mounting the holding device onto the fastening member, the anchoring section including a substantially cylindrical recessed portion having a circular opening, a bottom surface, and a first inward circumferential surface adapted to engage the first outward circumferential surface, and an opening in the bottom surface comprising a second inward circumferential surface adapted to engage the second outward circumferential surface of the fastening member. In a preferred embodiment, the holding device is a plastic material adapted to be deformed by contact of the first inward circumferential surface with the first outward circumferential surface upon mounting of the fastening member, whereby the holding device is fixed in a selected engagement position, and the first outward circumferential surface comprises a portion of a nut. In accordance with a preferred embodiment, the plastic material is also adapted to be deformed by contact of the second inward circumferential surface with the second outward circumferential surface upon mounting of the fastening member, the second inward circumferential surface comprising a threaded section into which the portion of the nut is screwed.

In accordance with one embodiment of the holding device of the present invention, the fastening member includes an end surface, and the bottom surface of the recessed portion is substantially planar and is adapted to form a stop face against the end section of the fastening member.

In accordance with another embodiment of the holding device of the present invention, the anchoring section comprises a sleeve-shaped section, and the device includes an arm extending from the anchor section, the arm supporting the holding section.

The objects of the present invention are accomplished by means of a holder, which has an anchoring section including a second engagement surface in the shape of a second inwardly facing circumferential surface which is formed by a hole in the bottom surface, wherein the hole is arranged to be biased onto a second section of the fastening member, and the recess is substantially cylindrical having a circular opening and a bottom surface.

BRIEF DESCRIPTION OF THE DRAWINGS

The present invention will be more fully appreciated by reference to the detailed description which, in turn, refers to the annexed drawings, in which:

FIG. 5 is a side, elevational, cross-sectional view corresponding to that of FIG. 4, taken through the holder when mounted; and FIG. 6A is a side, elevational, cross-sectional view of the holder shown in FIG. 3 in an exploded configuration before application of the anchoring section 2 to the screw 4 and nut 5;

FIG. 6B is a side, elevational, cross-sectional view corresponding to that of FIG. 6A, but with the anchoring section applied to the nut and screw; and FIG. 6C is a front end, perspective view of the holder shown in FIG. 6B.

DETAILED DESCRIPTION

Figure 1:
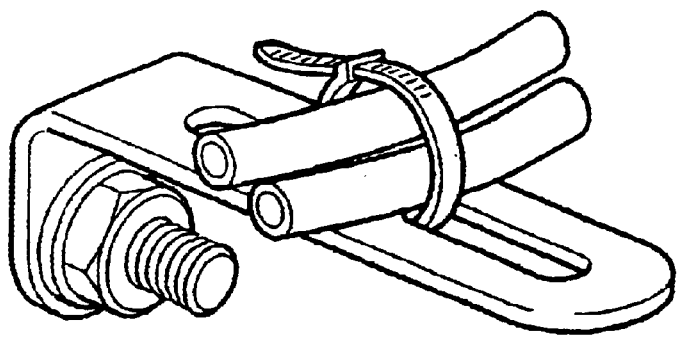
FIG. 1 is a side, perspective view of the prior art.
Figure 2:
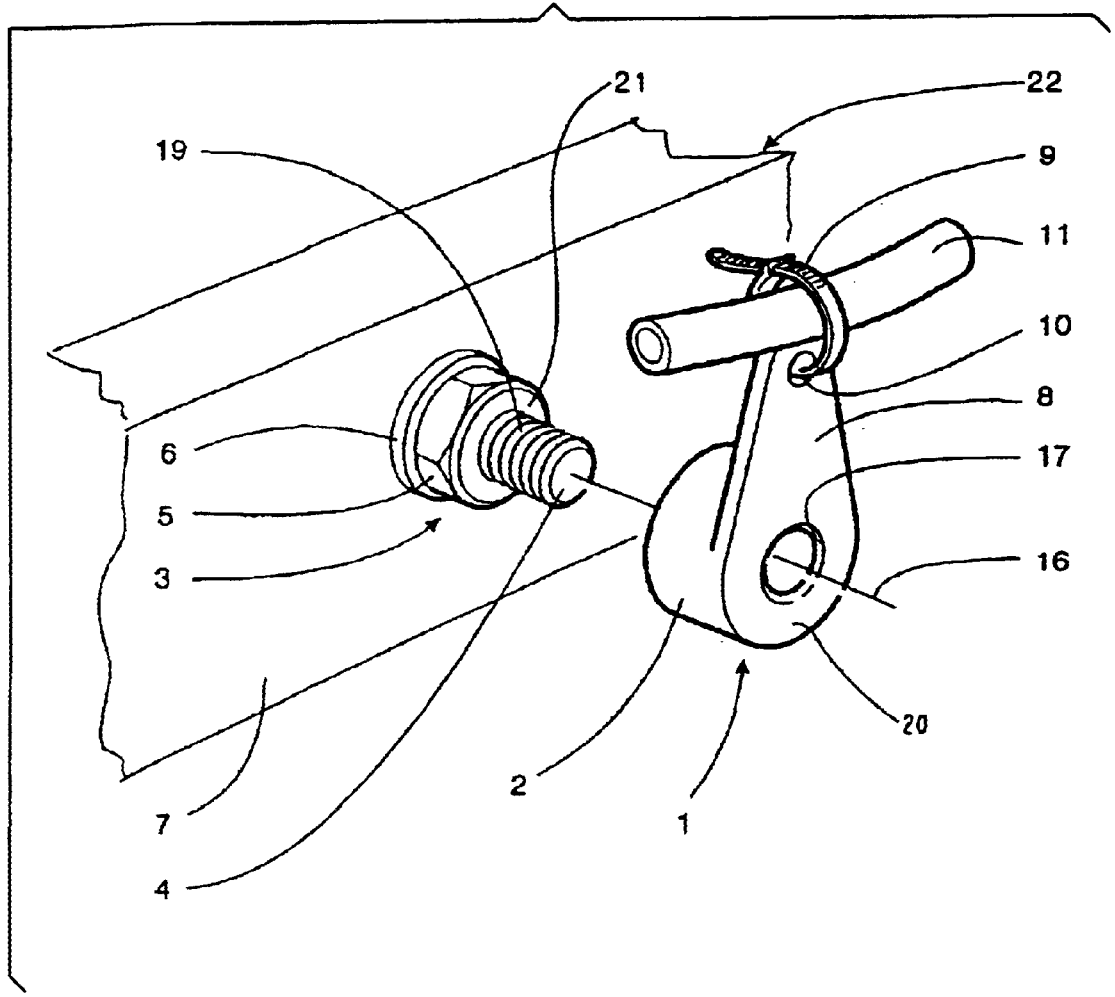
FIG. 2 is a front, partial, perspective, exploded view of a holder according to the present invention which is intended to be mounted on a screw joint.

As is apparent from FIG. 2, the holder 1 according to the present invention consists of an anchoring section 2, by means of which the holder is arranged to be fastened to a fastening member 3, such as a screw joint, which in this example is partially shown in the form of a screw 4, a nut 5 and a washer 6. The fastening member extends through a hole in a fastening wall 7, which in the example is formed by a beam 22 in, for example, a motor vehicle. In shown example, the holder 1 discloses an arm 8 and holding member 9, which in the example constitutes a bundle band which extends through a hole 10 in the end of the arm 8 and is intended to hold cabling 11, of which one cable is shown.

With reference to FIGS. 2 to 5, it can be seen that the anchoring section 2 is formed as a sleeve-shaped section having a first engagement surface in the shape of a circumferential surface 12, which in the example is arranged in a recess 13 of the anchoring section. In the example, the circumferential surface is substantially cylindrical, having a circular opening 14 and a cylinder envelope surface, which constitutes the circumferential surface 12, and a bottom surface 15 which forms a stop face for axial position-holding of the holder, more precisely so that the axis of symmetry 16 of the engagement section 2 coincides with the longitudinal axis of the fastening member. In the example, the holder also includes a second circumferential surface 17 which forms a second engagement surface. In this manner, a through, substantially cylindrical, opening is formed in the holder.

Figure 3:
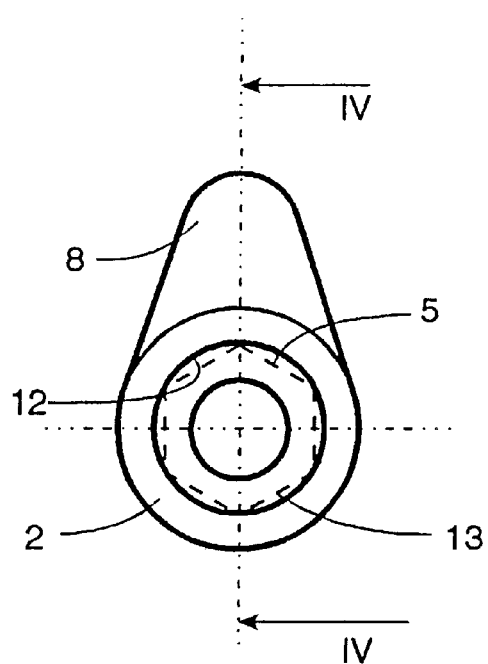
FIG. 3 is a front end, perspective view of the holder of the present invention.
Figure 4:
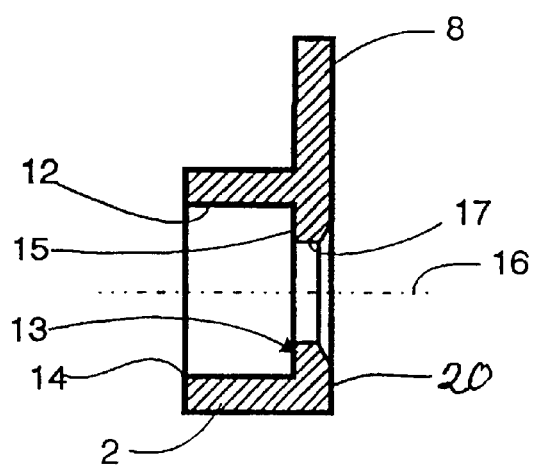
FIG. 4 is a side, elevational, cross-sectional view of the holder shown in FIG. 3, taken along line 4:4 thereof.

FIG. 5 shows the holder when mounted on the fastening member 3. The fastening member is mounted on the beam 22 and extends through a hole 18 in the fastening surface 7, wherein the nut 5 is tightened with the washer 6 being arranged between the nut and the fastening surface. In this regard, the screw 4 protrude with a threaded envelope surface 19 outside the nut 5. The holder 1 is dimensioned to de fastened to the screw member 3 by means of press fit onto its nut 5, more precisely onto its circumferential surface, wherein the dimension of the circumferential surface 12 of the shoulder substantially corresponds to, more precisely is slightly less than, the largest transverse dimension of the nut 5. Furthermore, the depth of the recess in axial direction is less than the height of the nut. As regards an angular nut such as that shown in FIG. 5, and whose contour line is indicated in FIG. 3, a slight deformation of the circumferential surface 12 of the holder takes place in practice, which results in an axial frictional engagement as well as a rotatably locked form engagement. The axial engagement is enforced by means of the second circumferential surface 17, which correspondingly is dimensioned for press fit onto the envelope surface 19 of the threaded screw. In the second circumferential surface 17 as well, a certain degree of deformation takes place in the holder material in practice, which reinforces the effective engagement thereof. To this end, the holder 1 is preferably constructed of a softer material than the existing fastening member, for example light metal, plastics or the like. Thermoplastics, as well as thermosetting plastics having a suitable balanced hardness are possible, for example polyethylene, polypropylene, PVC, polyester, acrylic, etc. By means of the engagement of the second circumferential surface, the stability of the holder mounting increases due to the large "engagement length," viewed along the axis of symmetry 16.

The mounting of the holder 1 takes place simply by means of hammer strokes in the axial direction against the planar impact surface 20 of the holder which is provided with, for example, an intermediate sleeve, until the end surface 21 of the nut bottoms against the bottom surface 15. Before mounting, the rotational position of the holder in relation to the axis 16 can be selected freely and fixed by means of the mounting process.

Dismounting is preferably carried out by means of rotation and axial pulling by means of, for example, tongs.

The invention is not limited to the embodiment which is described above and shown in the drawings. For example, the holder may be used in a construction which is not arranged in a vehicle. The nut may have another outer form.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A holding device for mounting predetermined objects comprising a plastic fastening member having a longitudinal axis and including a nut having a height and, a first outward circumferential surface, said fastening member including a second outward circumferential surface, a holding section having a single symmetrical axis for mounting said predetermined object, and an anchoring section for mounting said holding device onto said fastening member, said anchoring section including a substantially cylindrical recessed portion having a circular opening and a depth in its axial direction which is less than said height of said nut, a bottom surface forming a stop surface for said nut whereby said holder is axially positioned so that said single symmetrical axis of said holding section corresponds with said longitudinal axis of said fastening member, a first inward circumferential surface adapted to engage said first outward circumferential surface of said nut, and an opening in said bottom surface comprising a second inward circumferential surface adapted to engage said second outward circumferential surface of said fastening member, said plastic adapted to be deformed by contact of said first outward circumferential surface of said nut with said first inward circumferential surface upon mounting of said fastening member, and by contact of said second inward circumferential surface with said second outward circumferential surface upon mounting of said fastening member, whereby said holding device is fixed in a selected engagement position.

2. The holding device of claim 1 wherein said fastening member includes an end surface, and wherein said bottom surface of said recessed portion is substantially planar and is adapted to form a stop face against said end section of said fastening member.

3. The holding device of claim 1 wherein said anchoring section is in the form of a sleeve-shaped section, and including an arm extending from said anchoring section, said arm supporting said holding section.

* * * * *

UNITED STATES PATENT AND TRADEMARK OFFICE
CERTIFICATE OF CORRECTION

PATENT NO. : 6,672,547 B1
DATED : January 6, 2004
INVENTOR(S) : Peder Westerberg, Mats Söderlund and Ulf Granäng It is certified that error appears in the above-identified patent and that said Letters Patent is hereby corrected as shown below:

<u>Title page,</u>
Item [57], ABSTRACT,
Line 2, after "mounting" insert -- the --.

<u>Column 3,</u>
Line 19, "protrude" should read -- protrudes --.

<u>Column 4,</u>
Line 19, delete "plastic".
Line 20, delete ",".

Signed and Sealed this

Twenty-seventh Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,672,547 B1 Page 1 of 1
DATED : January 6, 2004
INVENTOR(S) : Peder Westerberg, Mats Söderlund and Ulf Granäng It is certified that error appears in the above-identified patent and that said Letters Patent is hereby corrected as shown below:

<u>Column 4,</u>
Line 22, after "surface," insert -- and a plastic holder comprising --.
Line 41, delete "inward" and insert therefor -- outward --.
Line 42, delete "outward" and insert therefor -- inward --.
Line 48, delete "section" and insert therefor -- surface --.

Signed and Sealed this

First Day of June, 2004

JON W. DUDAS
*Acting Director of the United States Patent and Trademark Office*